United States Patent
Persinger

(10) Patent No.: US 10,559,989 B2
(45) Date of Patent: Feb. 11, 2020

(54) ROTOR CARRIER AND LOCKING DIAPHRAGM SPRING

(71) Applicant: SCHAEFFLER TECHNOLOGIES AG & CO. KG, Herzogenaurach (DE)

(72) Inventor: Justin Persinger, Norton, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/670,204

(22) Filed: Aug. 7, 2017

(65) Prior Publication Data
US 2019/0040917 A1 Feb. 7, 2019

(51) Int. Cl.
| | |
|---|---|
| H02K 1/30 | (2006.01) |
| F16D 23/14 | (2006.01) |
| F16H 61/14 | (2006.01) |
| F16C 33/58 | (2006.01) |
| H02K 7/00 | (2006.01) |
| H02K 5/173 | (2006.01) |
| H02K 7/10 | (2006.01) |
| F16D 125/58 | (2012.01) |
| H02K 1/32 | (2006.01) |

(52) U.S. Cl.
CPC ............ H02K 1/30 (2013.01); F16C 33/586 (2013.01); F16D 23/145 (2013.01); F16H 61/143 (2013.01); H02K 5/1737 (2013.01); H02K 7/006 (2013.01); H02K 7/10 (2013.01); B60Y 2200/92 (2013.01); F16C 2361/43 (2013.01); F16C 2380/26 (2013.01); F16D 2125/582 (2013.01); H02K 1/32 (2013.01)

(58) Field of Classification Search
CPC .......... F16D 23/145; H02K 1/28; H02K 1/30; H02K 7/006; H02K 7/003; H02K 7/10
See application file for complete search history.

(56) References Cited

U.S. PATENT DOCUMENTS

| | | | | |
|---|---|---|---|---|
| 1,192,404 A | * | 7/1916 | Ewart ................... | F16C 35/063 29/520 |
| 2,630,897 A | * | 3/1953 | Porter ................... | F16D 23/145 192/110 R |

(Continued)

FOREIGN PATENT DOCUMENTS

| | | |
|---|---|---|
| DE | 102013221643 A1 | 4/2015 |
| EP | 1150007 A2 | 10/2001 |

(Continued)

OTHER PUBLICATIONS

International Search Report and Written Opinion for PCT/US2018/016169, dated Apr. 19, 2018, 10 pages.

(Continued)

Primary Examiner — Frank B Vanaman
(74) Attorney, Agent, or Firm — Brooks Kushman P.C.

(57) ABSTRACT

A hybrid drive module, comprising an annular diaphragm spring having an inner surface and one or more fingers protruding radially inward from the inner surface and a carrier hub concentric with the diaphragm spring and connected to a rotor of an electric motor and a cover of a torque converter, the carrier hub having an outer surface with one or more retention grooves configured to interlock with the one or more fingers of the diaphragm spring to inhibit axial movement of the diaphragm spring relative to the carrier hub.

16 Claims, 3 Drawing Sheets

(56) References Cited

U.S. PATENT DOCUMENTS

| | | | |
|---|---|---|---|
| 3,525,888 A | 8/1970 | Linn | |
| 4,074,158 A * | 2/1978 | Cole | H02K 5/1677 277/410 |
| 5,234,278 A * | 8/1993 | Hall, III | B60K 17/02 403/315 |
| 5,423,568 A * | 6/1995 | Zushi | B60R 21/217 280/728.2 |
| 5,931,271 A * | 8/1999 | Haka | B60K 6/26 180/65.25 |
| 6,382,606 B1 * | 5/2002 | Horng | F16C 27/08 267/161 |
| 6,668,953 B1 | 12/2003 | Reik et al. | |
| 7,954,578 B2 | 6/2011 | Kim et al. | |
| 7,980,781 B2 * | 7/2011 | Trice | B25G 1/04 403/109.3 |
| 9,140,311 B2 | 9/2015 | Iwase et al. | |
| 9,528,559 B2 | 12/2016 | Lee et al. | |
| 2002/0036434 A1 | 3/2002 | Tsuzuki et al. | |
| 2002/0065171 A1 | 5/2002 | Raber | |
| 2004/0045752 A1 | 3/2004 | Omote et al. | |
| 2005/0180047 A1 | 8/2005 | Suzuki et al. | |
| 2007/0257569 A1 * | 11/2007 | Heyder | F16F 1/326 310/66 |
| 2009/0255506 A1 | 10/2009 | Walker | |
| 2010/0079029 A1 * | 4/2010 | Muller | H02K 1/22 310/216.114 |
| 2010/0105518 A1 | 4/2010 | Kasuya et al. | |
| 2011/0057522 A1 | 3/2011 | Blessing et al. | |
| 2012/0032544 A1 | 2/2012 | Kasuya et al. | |
| 2013/0057117 A1 | 3/2013 | Suzuki et al. | |
| 2014/0091649 A1 | 4/2014 | Dragon et al. | |
| 2016/0105060 A1 | 4/2016 | Lindemann et al. | |
| 2016/0109010 A1 | 4/2016 | Lindemann et al. | |
| 2017/0043657 A1 | 2/2017 | Schmitt et al. | |

FOREIGN PATENT DOCUMENTS

| | | |
|---|---|---|
| JP | 2000289475 A | 10/2000 |
| JP | 2004001708 A | 1/2004 |

OTHER PUBLICATIONS

International Search Report for Application No. PCT/US2018/037983, dated Sep. 18, 2018, 9 pages.

* cited by examiner

US 10,559,989 B2

ROTOR CARRIER AND LOCKING DIAPHRAGM SPRING

TECHNICAL FIELD

The present disclosure relates generally to a hybrid drive module including an electric motor with a rotor. Rotor segments may need to be held to a rotor carrier.

BACKGROUND

Vehicles may utilize a hybrid combination of both an internal combustion engine and an electric motor to power the vehicle.

SUMMARY

According to one embodiment, a hybrid drive module, comprising an annular diaphragm spring having an inner surface and one or more fingers protruding radially inward from the inner surface and a carrier hub concentric with the diaphragm spring and connected to a rotor of an electric motor and a cover of a torque converter, the carrier hub having an outer surface with one or more retention grooves configured to interlock with the one or more fingers of the diaphragm spring to inhibit axial movement of the diaphragm spring relative to the carrier hub.

According to a second embodiment, a method of interlocking a diaphragm spring and a carrier hub in a hybrid drive module, the method comprising axially compressing a diaphragm spring in a first direction against the rotor carrier hub such that inwardly-extending fingers of the diaphragm spring are disposed within retention grooves formed in the carrier hub, rotating the diaphragm spring about the axis such that the fingers slide along circumferentially extending portions of the retention grooves, and releasing the diaphragm spring to enable axial movement of the spring in a second direction.

According to a third embodiment, a carrier hub of a hybrid drive module including a torque converter and an electric motor including a rotor, the carrier hub comprising a carrier hub surface including a retention groove configured to interlock the carrier hub to one or more fingers of a diaphragm spring and inhibit rotation and axial movement of the diaphragm spring relative to the carrier hub, wherein the retention groove includes a first and second passageway connected by a third passageway, wherein the first, second, and third passageways extend in different directions to allow the finger to be translated along the retention groove in three different directions.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A modular hybrid transmission module may include rotor segments installed onto a carrier riveted to a cover of a torque converter. The rotor segments may need to minimize or eliminate the capability of moving or shifting during functioning of the hybrid transmission module. Certain designs may utilize a ring, which is shrunk fit onto the carrier, to facilitate reduction of the movement. The stack of rotor segments may need to be held to the rotor carrier with an axial clamp force sufficient to transfer torque from the rotor segments to the rotor carrier via friction without slipping. It may not be beneficial for torque transmission to occur via an alternative load path such as a keyway. Mitigation of slipping may insure that rotor segments do not move relative to the rotor carrier, thus insuring a constant air gap between rotor segments and stator, which may improve motor efficiency and performance. It may need to be considered that such mitigation of slipping may occur in operating temperature extremes ranging for −40 Celsius to 150 Celsius. Metals with dissimilar coefficients of linear expansion may require the use of a spring element.

Figure 1:
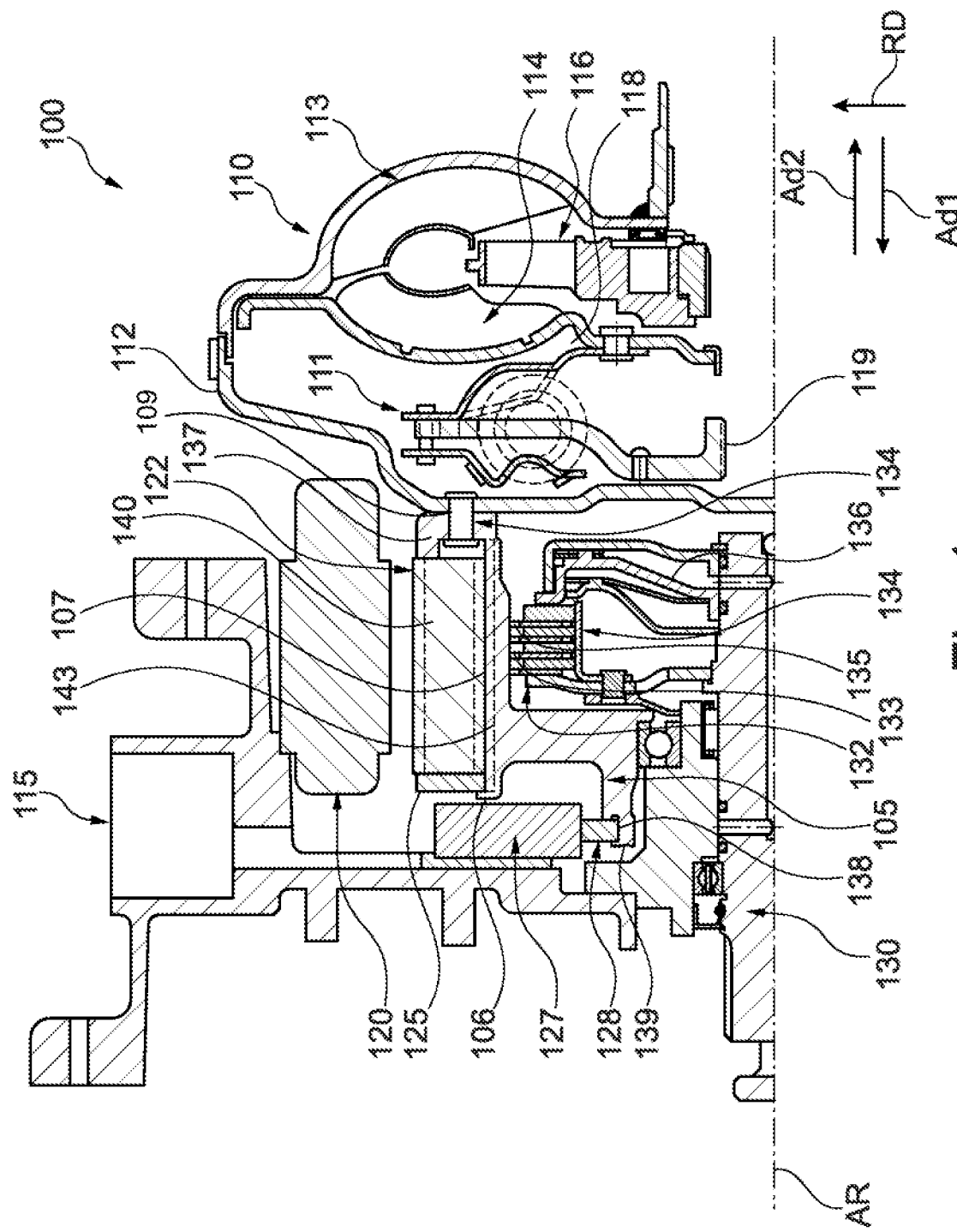
FIG. 1 is a cross-sectional view of a hybrid drive module.

FIG. 1 is a cross-sectional view of an example hybrid drive module 100. Hybrid drive module 100 (hereinafter referred to as module 100) may include, but is not limited to, the following components: axis of rotation AR; torque converter 110; carrier hub or hub 105; end plate 125; and electric motor 120 including rotor 122. Torque converter 110 may include a cover 112, impeller 113, turbine 114, and stator 116. The carrier hub 105 may be connected, including in a non-rotatable fashion, to cover 112 by one or more rivets 109. The carrier hub 105 may include a circumferential surface 107 and protrusions 106. The carrier hub 105 may also include two or more components affixed together with additional hardware in the assembly. Rotor 122 may be engaged with surface 107 and is non-rotatably connected to hub 105, for example, by splines 143. Plate 125 may be engaged with rotor 122. One or more protrusions 106 may extend radially outward in direction RD from circumferential surface 107, are formed of the material forming hub 105, are in contact with plate 125, and restrain plate 125 and rotor 122 in direction AD1.

In one example embodiment, protrusions 106 may restrain plate 125 and rotor 122 with respect to movement in axial direction AD2, opposite direction AD1. That is, protrusions 106 fix an axial position of rotor 122 on hub 105. For example, protrusions 106 are in contact with plate 125, which forces rotor 122 into contact with shoulder 137 of hub 105. Thus, rotor 122 is unable to displace in either direction AD1 or AD2.

In one example embodiment, the hub 105 may include a circumferential surface 138 and protrusions 139. While this embodiment of surface 138 may be circumferential, it may also be planar or substantially planar and not limited to a circumferential surface. The module 100 may also include a resolver rotor 128 that is engaged with surface 138. Protrusions 139 may extend radially outward in direction RD from the circumferential surface 138, are formed of the material forming hub 105, and fix rotor 128 to hub 105. The resolver 127 may be fixed to housing 115. The resolver 127 may detect the rotational position of resolver rotor 128 on hub 105 in order to control the rotation and power output of electric motor 120.

In one example, module 100 includes or, is arranged to engage, input part 130 and includes disconnect clutch 132. Part 130 is arranged to receive torque, for example, from an internal combustion engine (not shown). Clutch 132 includes at least one clutch plate 133 non-rotatably connected to hub 105, inner carrier 134 non-rotatably connected to input part 130, clutch plate 135 non-rotatably connected to inner carrier 134, and piston plate 136 axially displaceable to open and close clutch 132. Clutch 132 enables selective connection of input part 130 and cover 112. Thus, module 100 can function in at least three modes. For a first mode, clutch 132 is open and electric motor 120, via rotor 122, is the only source of torque for torque converter 110. For a second mode, clutch 132 is closed, electric motor 120 is not driving torque converter 110, and the only source of torque for torque converter 110 is input part 130 via the disconnect clutch. For a third mode, clutch 132 is closed and motor 120 is used to provide torque to input part 130 to start an internal combustion engine (not shown) attached to input part 130.

In an example embodiment, torque converter 110 may include a torsional vibration damper 111 with input part 118 connected to turbine 114, an output part 119 arranged to connect to a transmission input shaft (not shown), and at least one spring 121 engaged with input part 118 and output part 119.

In an example embodiment, hub 105 may be made of cast aluminum, although other materials may be utilized, such as a cast ductile iron. In a carrier hub 105 with two or more major components, different materials may be used amongst components. Protrusions 106 and 139 may be a material different from cast aluminum (e.g. not cast) of the hub and are not formed by any type of bending operation. Instead, protrusions 106 and 139 may be fabricated by staking the cast hub. For example, deformed portions may be created respective to portions of the cast hub with one or more punches. The deformed portions may form protrusions 106 and 139 and secure the rotor and resolver rotor to the hub without fasteners or other added materials. Specifically, the material deformed and displaced by the staking forms protrusions 106 and 139 and creates respective interference fits between protrusions 106 and plate 125 and between protrusions 139 and the rotor.

The difference between protrusions formed in a casting process and staked protrusions may be exemplified by the physical characteristics of the material. For example, aluminum, forming the cast hub (and not staked or deformed by staking) and the material forming the deformed protrusions. For example, the material forming the cast hub and not staked or deformed by the staking (for example not including material adjoining protrusions 106 or 139) has 'x' number of lattice defects, including point defects or imperfections, line defects, or surface defects-grain boundaries, per unit of volume. The material forming protrusions 106 may have 'y', greater than 'x', number lattice defects, including point defects or imperfections, line defects, or surface defects-grain boundaries, per unit of volume. The material forming protrusions 139 may have 'z', greater than 'x', number lattice defects, including point defects or imperfections, line defects, or surface defects-grain boundaries, per unit of volume. The increase in lattice defects results from the deformation, by the staking process, of the material forming the original cast hub.

In an example embodiment, hub 105 is made of aluminum, which may be used to reduce the weight and rotational inertia of the hub, and cover 112 is made of steel, reducing the cost of manufacturing cover 112 and increasing the durability of cover 112. In another embodiment the carrier hub may be made from 4140 steel due to its high ductility behavior. In other embodiments, other materials may be used for the carrier hub, including but not limited to stainless steel or other metals and alloys, cast ductile iron, or other similar materials.

Figure 2:
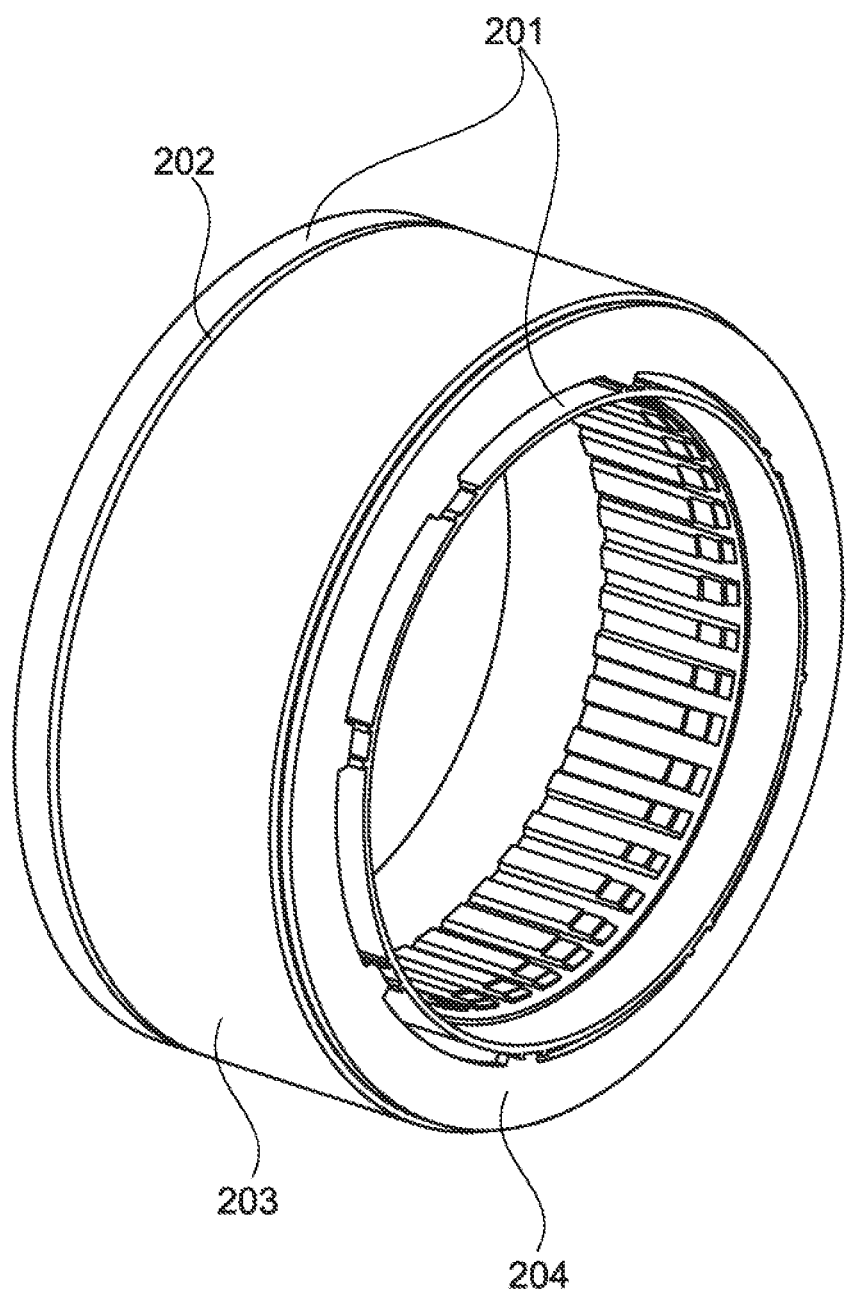
FIG. 2 illustrates an perspective view of a rotor carrier hub and diaphragm spring that are interlocked upon one another.

FIG. 2 illustrates a perspective view of a rotor carrier hub and diaphragm spring interlocked with respect to one another. A rotor carrier 201 or carrier hub is illustrated in FIG. 2. Spacers 202 may be placed in between the rotor carrier 201 and rotor segment 203. Additionally, the spacers 202 may be used between the rotor segment 203 and the diaphragm spring 204. As discussed further below, a diaphragm spring 204 is assembled to the rotor carrier 201 in an interlocked fashion with fingers that are located at the inner diameter of the diaphragm spring 204.

Figure 3:
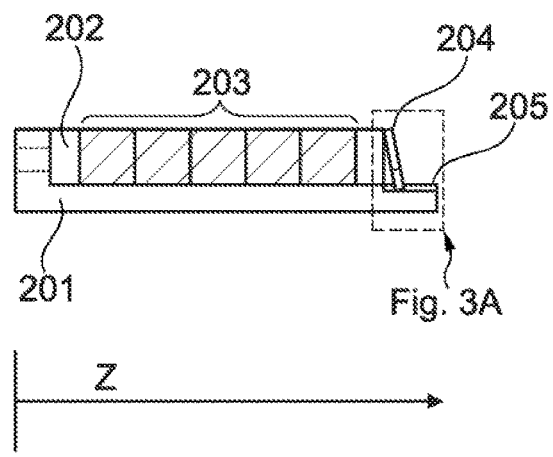
FIG. 3 illustrates a cross-sectional view of a rotor carrier hub and diaphragm spring.
Figure 3:
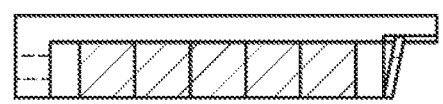

FIG. 3 illustrates a cross-sectional view of a rotor carrier hub and diaphragm spring. A first embodiment may include a rotor carrier hub 201. The rotor carrier hub 201 may be constructed from ductile cast iron though may also be cast aluminum, forged steel, spin formed steel, or other material. Spacers 202 may be located at each end of the rotor segment 203 stack, isolating the rotor segments 203 from the rotor carrier 201 and diaphragm spring 204. The spacers 202 may be used to shield the rotor segments 203 from the rotor carrier 201 and diaphragm spring 204, which may be constructed from magnetic materials. The spacers 202 also may provide specific coolant flow passages in combination with coolant flow passages that are in the rotor carrier 201. The spacers 202 may also be constructed from die cast aluminum or other non-magnetic materials. The rotor segments 203 may be affixed to the rotor carrier 201 by utilizing an axial clamping force accomplished by the diaphragm spring 204. The axial clamping force may be sufficient to facilitate torque transfer between rotor segments 203 and rotor carrier 201 by friction without slipping. The diaphragm spring 204 may be designed and constructed from spring steel.

Figure 3A:
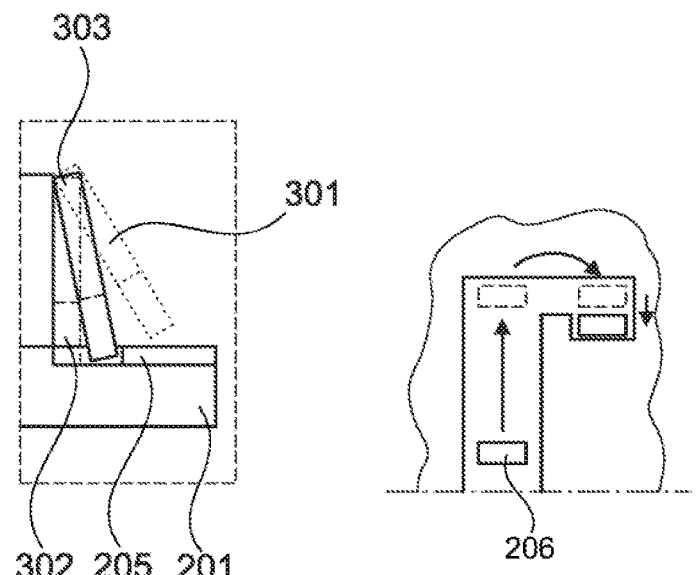
FIG. 3A is a detailed view of a retention groove a rotor carrier and diaphragm spring interacting amongst one another.

The rotor carrier 201 may also include a retention groove that is shown in the box of FIG. 3. A detailed view of the box is shown in FIG. 3A. The retention groove may allow the rotor carrier to interlock with the diaphragm spring 204 or one or more fingers of the diaphragm spring, as explained further below. The retention groove may work in conjunction with the one or more fingers of the diaphragm spring 204 to interlock with the rotor carrier 201 upon the spring being pushed against, twisted, and released against the carrier hub 201.

FIG. 3A is an enlarged view of a retention groove of the rotor carrier hub interacting with the diaphragm spring. The rotor carrier 201 may include a retention groove 205. In one embodiment, the diaphragm spring may be in a free state 301. Thus, the fingers of the diaphragm spring 204 may not be interlocked with the rotor carrier 201 and the diaphragm spring 204 may move freely with respect to the carrier hub 201. The diaphragm spring may then be compressed radially inward such that the fingers slide along and within the retention grooves 205. This allows the diaphragm spring to be in a fully compressed state 302. The diaphragm spring may then be rotated relative to the central axis and relative to the carrier hub. After rotation, the diaphragm spring may be released to allow the diaphragm spring to translate axially in an opposite direction, enabling the spring to be in an installed state 303.

Figure 4:
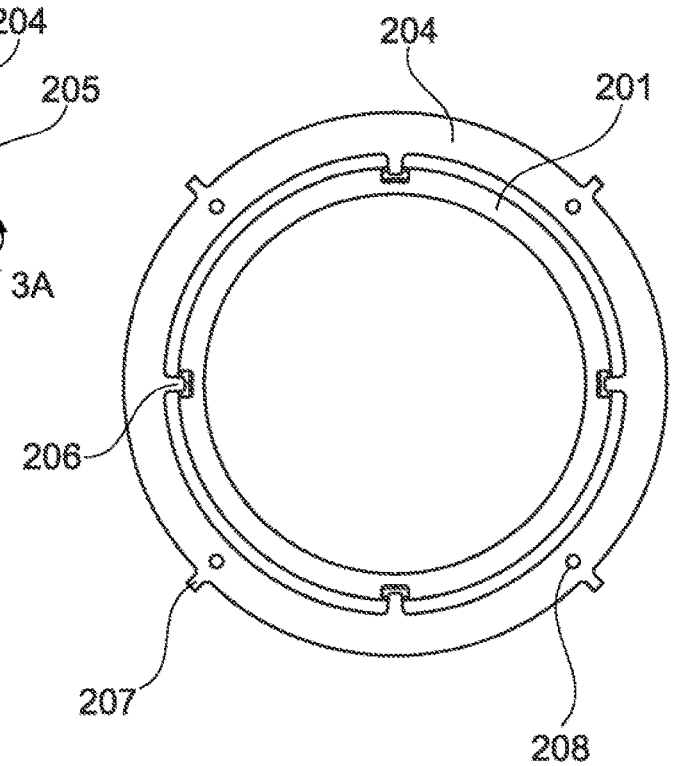
FIG. 4 illustrates a top view of the diaphragm spring.

FIG. 4 illustrates a top view of the diaphragm spring. The diaphragm spring 204 may include various fingers, including one or more inner diameter (ID) fingers 206 and one or more outer diameter (OD) fingers 207. The diaphragm spring's ID fingers 206 may be along an inner surface of the diaphragm spring 204 and may be designed to interlock with retention grooves that may be machined, cast, forged, or otherwise formed into the rotor carrier 201. As discussed further below, the retention grooves may be "L-shaped" or angled/helical. The OD finger 207 may be located and protruding from an outer surface of the diaphragm spring 204. The diaphragm spring may have multiple ID fingers 206 and OD fingers 207, or may only include a single ID finger 206. The ID fingers 206 and OD fingers 207 may be equally spaced apart about a circumference of the diaphragm spring 204, or may be randomly spaced apart.

The diaphragm spring may utilize the OD fingers 207 or through holes 208 to interface with tooling during assembly. For example, the OD fingers 207 and through holes 208 may be utilized to interface with tooling that allows the diaphragm spring 204 to rotate in order to "lock" the diaphragm spring with the rotor carrier 201. Assembly tooling (not pictured) may have enhanced friction characteristics from roughening, etching, peening, coating, or other processes such that a local coefficient of the friction between the assembly tooling and the diaphragm spring 204 exceeds a local coefficient of a friction between the diaphragm spring 204 and spacer 202. Such friction characteristics may be located where the tooling interacts with the diaphragm spring 204. In one example, the diaphragm spring 204 may be rotated during assembly by friction with the assembly tooling only.

Figure 5A:
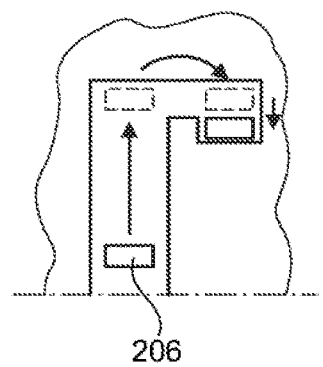
FIG. 5A illustrates a detailed view of one illustrative embodiment of a retention groove of a carrier hub that includes an L-shaped recess.

FIG. 5A illustrates a schematic view of one illustrative embodiment of a retention groove of a carrier hub that includes an L-shaped recess. The retention groove 205 may include various shapes and configurations for an anti-rotation feature that prevents the diaphragm spring 204 from moving against the rotor carrier 201. In one example, the retention groove 205 may include an "L-shaped" recess that is formed by two parallel or substantially parallel surfaces or passageways of the carrier hub that are connected by another surface or passageway, as shown in FIG. 5A. As shown further in FIG. 5A, the L-shaped recess may have an anti-rotation feature that is accomplished when the diaphragm spring 204 is compressed in one direction along an axis to allow the ID fingers 206 to slide within a first passageway against the rotor carrier 201. After compression, the diaphragm spring may be twisted or rotated about that axis against the rotor carrier along the second passageway to allow the diaphragm spring 204 to be placed or sit in the recess. The diaphragm spring 204 may then be released from the rotor carrier 201 to allow the diaphragm spring to move within a third passageway along the axis in an opposite direction than the compression. This allows the diaphragm spring to be "locked" with respect to the carrier hub to prevent any rotation or to mitigate movement against the carrier 201.

Figure 5B:
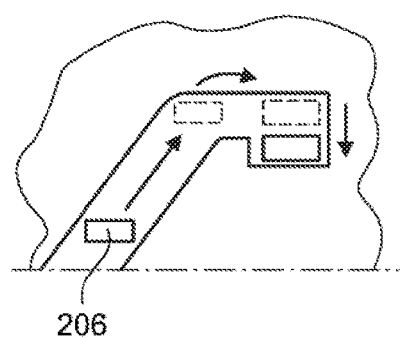
FIG. 5B illustrates a detailed view of an illustrative embodiment of a retention groove of a carrier hub that includes an angled recess.

FIG. 5B illustrates a schematic view of an illustrative embodiment of a retention groove of a carrier hub that includes an angled recess or helical recess. The retention groove 205 may include various shapes and configurations to include an anti-rotation feature that prevents the diaphragm spring 204 from moving against the rotor carrier 201. In one example, the retention groove 205 may include an angled recess that is formed by two angled passageways (e.g. not parallel) within the carrier hub that are connected by another passageway, as shown in FIG. 5A. As shown in FIG. 5A, the angled recess may have an anti-rotation feature that is accomplished when the diaphragm spring 204 is compressed against the rotor carrier 201 in a first angled direction along the first passageway. After compression, the diaphragm spring may be twisted relative to the rotor carrier in order to allow the ID fingers 206 of the diaphragm spring 204 to slide along the second passageway. The diaphragm spring 204 may then be released from the rotor carrier 201 so that the fingers 206 can slide along the third passageway and be "locked" with respect to the rotor carrier to prevent any rotation or to mitigate movement against the carrier 201.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE SYMBOLS

Hybrid drive module 100
Carrier hub 105
Protrusions 106
Surface 107
Rivets 109
Torque converter 110
Torsional Vibration Damper 111
Cover 112
Impeller 113
Turbine 114
Housing 115
Stator 116

Input Part 118
Output Part 119
Motor 120
One Spring 121
Rotor 122
Plate 125
Resolver Rotor 127
Rotor 128
Input Part 130
Close Clutch 132
Disconnect Clutch 132
One Clutch Plate 133
Inner Carrier 134
Clutch Plate 135
Piston Plate 136
Shoulder 137
Circumferential Surface 138
Protrusions 139
Splines 143
Rotor Carrier 201
Spacers 202
Rotor Segments 203
Diaphragm Spring 204
Retention Groove 205
Inner Diameter (ID) Fingers 206
Outer Diameter (OD) Fingers 207
Holes 208
Free State 301
Fully Compressed 302
Installed State 303

What is claimed is:

1. A hybrid drive module, comprising:
an annular diaphragm spring having an inner surface and one or more fingers protruding radially inward from the inner surface; and
a carrier hub concentric with the diaphragm spring and connected to a rotor of an electric motor and a cover of a torque converter, the carrier hub having an outer surface with one or more retention grooves configured to interlock with the one or more fingers of the diaphragm spring to inhibit axial movement of the diaphragm spring relative to the carrier hub, wherein the one or more retention grooves are configured to mitigate rotation between the carrier hub and diaphragm spring when the one or more retention grooves are in contact with the one or more fingers, wherein the one or more retention grooves each include a first passageway configured to receive one of the fingers, a second passageway generally perpendicular from the first passageway, and third passageway generally parallel with the first passageway.

2. The hybrid drive module of claim 1, wherein the one or more fingers are configured to interlock with the one or more retention grooves of the carrier hub upon compression, rotation, and release of the diaphragm spring against the carrier hub.

3. The hybrid drive module of claim 1, wherein the diaphragm spring includes one or more outer fingers circumferentially spaced along an outer surface of the diaphragm spring.

4. The hybrid drive module of claim 1, wherein the one or more fingers cooperate to define a contact surface between the diaphragm spring and the carrier hub, and wherein no other portions of the diaphragm spring and carrier hub contact one another.

5. The hybrid drive module of claim 1, wherein the diaphragm spring further includes one or more holes circumferentially spaced on a surface of the spring.

6. The hybrid drive module of claim 1, wherein the carrier hub further includes a spacer located between the one of the retention grooves and a rotor segment.

7. A method of interlocking a diaphragm spring and a carrier hub in a hybrid drive module, comprising:
axially compressing a diaphragm spring in a first direction against the carrier hub such that inwardly-extending fingers of the diaphragm spring are disposed within retention grooves formed in the carrier hub;
rotating the diaphragm spring about an axis such that the fingers slide along circumferentially extending portions of the retention grooves that include a first and second passageway connected by a third passageway, wherein the first, second, and third passageways extend in different directions to allow the finger to be translated along the retention groove in three different directions; and
releasing the diaphragm spring to enable axial movement of the spring in a second direction.

8. The method of claim 7, wherein the fingers are circumferentially spaced along an inner surface of the diaphragm spring.

9. The method of claim 7, wherein the diaphragm spring further includes one or more outer fingers located along an outer surface of the diaphragm spring.

10. The method of claim 7, wherein the diaphragm spring further includes holes circumferentially spaced along a surface of the diaphragm spring.

11. A carrier hub of a hybrid drive module including a torque converter and an electric motor including a rotor, the carrier hub comprising:
a carrier hub surface including a retention groove configured to interlock the carrier hub to one or more fingers of a diaphragm spring and inhibit rotation and axial movement of the diaphragm spring relative to the carrier hub, wherein the retention groove includes a first and second passageway connected by a third passageway, wherein the first, second, and third passageways extend in different directions to allow the finger to be translated along the retention groove in three different directions.

12. The carrier hub of claim 11, wherein the first passageway is substantially parallel to the third passageway.

13. The carrier hub of claim 11, wherein the first passageway is angled relative to the second passageway.

14. The carrier hub of claim 11, wherein the carrier hub further includes a spacer located between rotor segments and the diaphragm spring.

15. The carrier hub of claim 11, wherein the carrier hub includes a spacer located between the carrier hub and rotor segments.

16. The carrier hub of claim 11, wherein the third passageway is generally perpendicular to the second passageway.

* * * * *